United States Patent
Nakanishi et al.

(10) Patent No.: US 7,204,664 B2
(45) Date of Patent: Apr. 17, 2007

(54) GLASS DRILL BIT

(75) Inventors: Eiichi Nakanishi, Osaka (JP); Walter Hester, Lahaina, HI (US)

(73) Assignee: Maui Jim, Inc., Peoria, IL (US)

( * ) Notice: Subject to any disclaimer, the term of this patent is extended or adjusted under 35 U.S.C. 154(b) by 105 days.

(21) Appl. No.: 10/981,037

(22) Filed: Nov. 4, 2004

(65) Prior Publication Data

US 2006/0093446 A1    May 4, 2006

(51) Int. Cl.
*B23B 35/00*    (2006.01)
(52) U.S. Cl. ............... 408/1 R; 408/145; 408/224; 451/541; 451/41
(58) Field of Classification Search ............. 408/1 R, 408/37, 61, 145, 199–230; 451/41, 42, 540, 451/541; *G02C 1/02; B26F 1/16*
See application file for complete search history.

(56) References Cited

U.S. PATENT DOCUMENTS 2,978,846 A * 4/1961 Barron ................. 451/541
3,688,386 A * 9/1972 Pereira ................. 29/558
4,483,108 A * 11/1984 Howard ................ 451/41
4,800,686 A * 1/1989 Hirabayashi et al. ......... 451/41
5,354,155 A * 10/1994 Adams ................. 408/145
5,944,263 A * 8/1999 Lucco et al. ............. 239/587.1
6,196,908 B1 * 3/2001 Adams ................. 451/461
6,511,267 B2 * 1/2003 Slaughter ............... 408/1 R

FOREIGN PATENT DOCUMENTS

JP          64-078710 A  *  3/1989

* cited by examiner

*Primary Examiner*—Daniel W. Howell
(74) *Attorney, Agent, or Firm*—Brett Trout

(57) ABSTRACT

A method and apparatus for drilling glass using a drill and drill bit. The method utilizes a drill bit having a plurality of shaft diameters, and being provided with a plurality of types of abrasives. By providing a coarser abrasive on a narrow portion of the bit, and finer abrasives on a wider portion of the bit, drilling can be accomplished while reducing the incidents of micro fracture in the glass being drilled. Providing an even narrower connection shaft between the two cutting portions of the drill bit further facilitates reduction in micro fractures created during the drilling process.

2 Claims, 9 Drawing Sheets

GLASS DRILL BIT

BACKGROUND OF THE INVENTION

1. Field of the Invention

The present invention relates in general to a method for drilling glass and, more particularly, to a method for drilling a curved glass and plastic laminate.

2. Description of the Prior Art

It is known in the art to drill glass. Prior art methods often involve the use of drill spindle pairs driven toward one another from above and below a glass pane meeting to form a bore. Such prior art methods typically involve a great amount of manual technical expertise, becoming very labor intensive and costly. Additionally, prior art methods often result in a high amount of damaged glass, adding to the cost and time associated with producing usable articles. While it is known in the art to utilize drilling machines and methods such as those described in U.S. Pat. No. 4,623,287, such prior art requires a plurality of drill bits, a complex and expensive advancement system, and a high level of skill associated with its maintenance and use.

Accordingly, it would be desirable to provide a low cost and simple methodology to reduce the amount of high-level, technical skill needed to drill glass, while increasing the success rate of the operation. The difficulties encountered in the prior art discussed hereinabove are substantially eliminated by the present invention.

SUMMARY OF THE INVENTION

In an advantage provided by this invention, a method for drilling glass is provided which drills through curved glass and plastic laminate.

Advantageously, this invention provides a method for drilling glass which reduces breakage.

Advantageously, this invention provides a method for drilling glass which reduces the technical expertise needed to drill the glass.

Advantageously, this invention provides a method for drilling glass which may be controlled automatically.

Advantageously, in a preferred example of this invention, a drill bit and method for drilling glass is provided in which the drill bit is provided with a first shaft of a first diameter, a second shaft of a second diameter, and a third shaft of a third diameter. The first shaft is provided at the tip of the drill bit and the second shaft couples the first shaft to the third shaft. The first shaft is preferably thicker than the second shaft, and the third shaft is preferably thicker than both the first and second shafts. The first shaft is preferably provided with a coarse abrasive, used to cut the glass, and the third shaft is provided with a finer grade abrasive, to cut and polish the glass to reduce cracking problems associated with prior art drill bits. The third shaft preferably tapers toward the second shaft, which may also be provided with an abrasive to assist in the removal of dross from a hole being drilled in the glass, and to prevent undesired attachment of dross to the second shaft itself.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
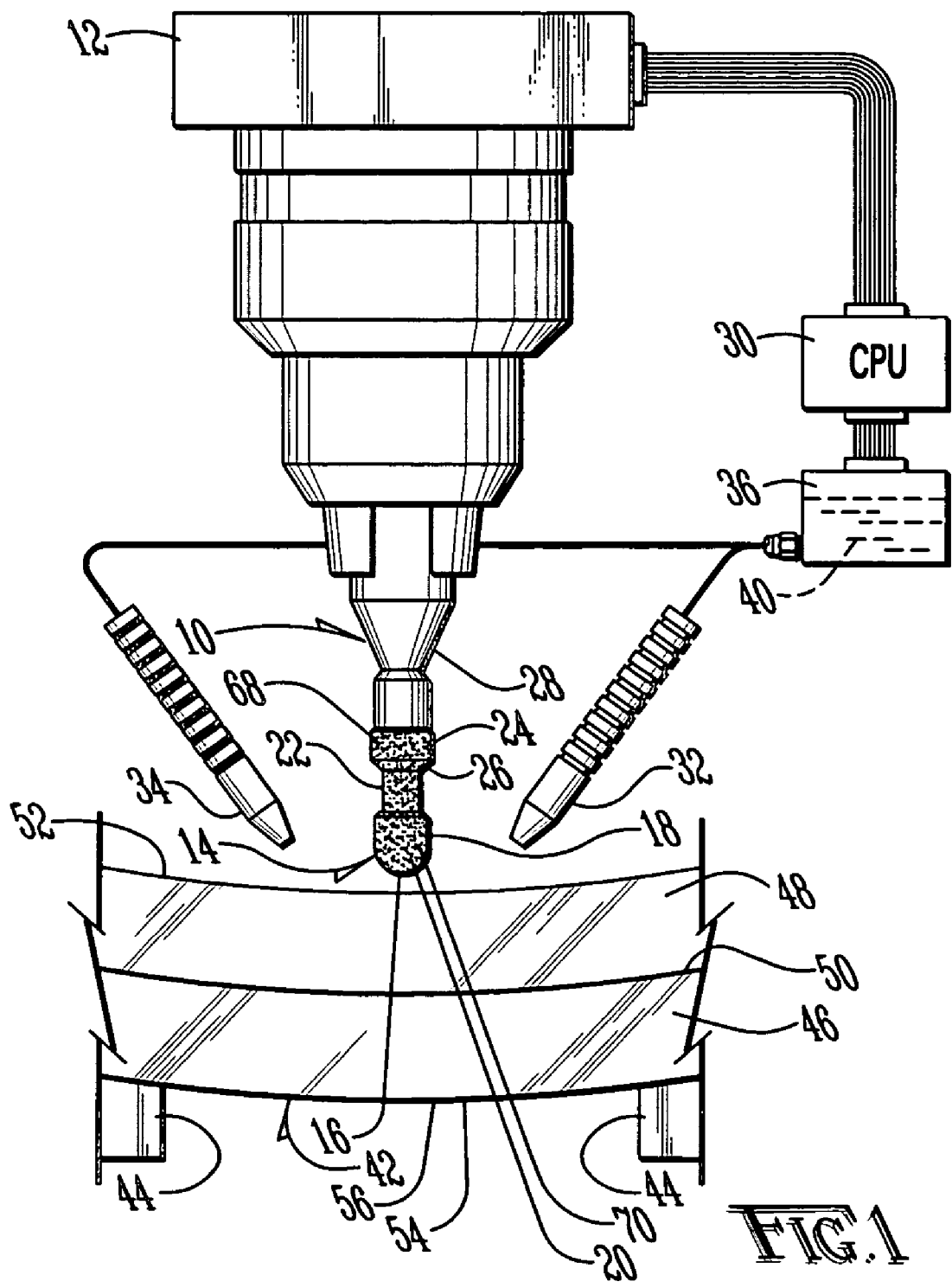
FIG. 1 illustrates a side elevation in partial cross-section of the drill and glass prior to drilling the concave portion of the glass.

Referring to the figures, a drill bit according to the present invention is shown generally as (10) in FIG. 1. The drill bit (10) is coupled to a drill press (12). The drill press (12) and its respective components are not shown in detail since they are well known in the art. A drill press (12) such as the Astro-E400, distributed by NSK America Corporation of 700 Cooper Ct., Ste. B, Schaumburg, Ill. 60173, or any other suitable drill press known in the art, preferably capable of rotating the drill bit (10) at a speed of at least 30,000 revolutions per minute, and capable of extending and retracting the drill bit (10) in increments of $\frac{1}{100}$th of a millimeter or less.

Figure 2:
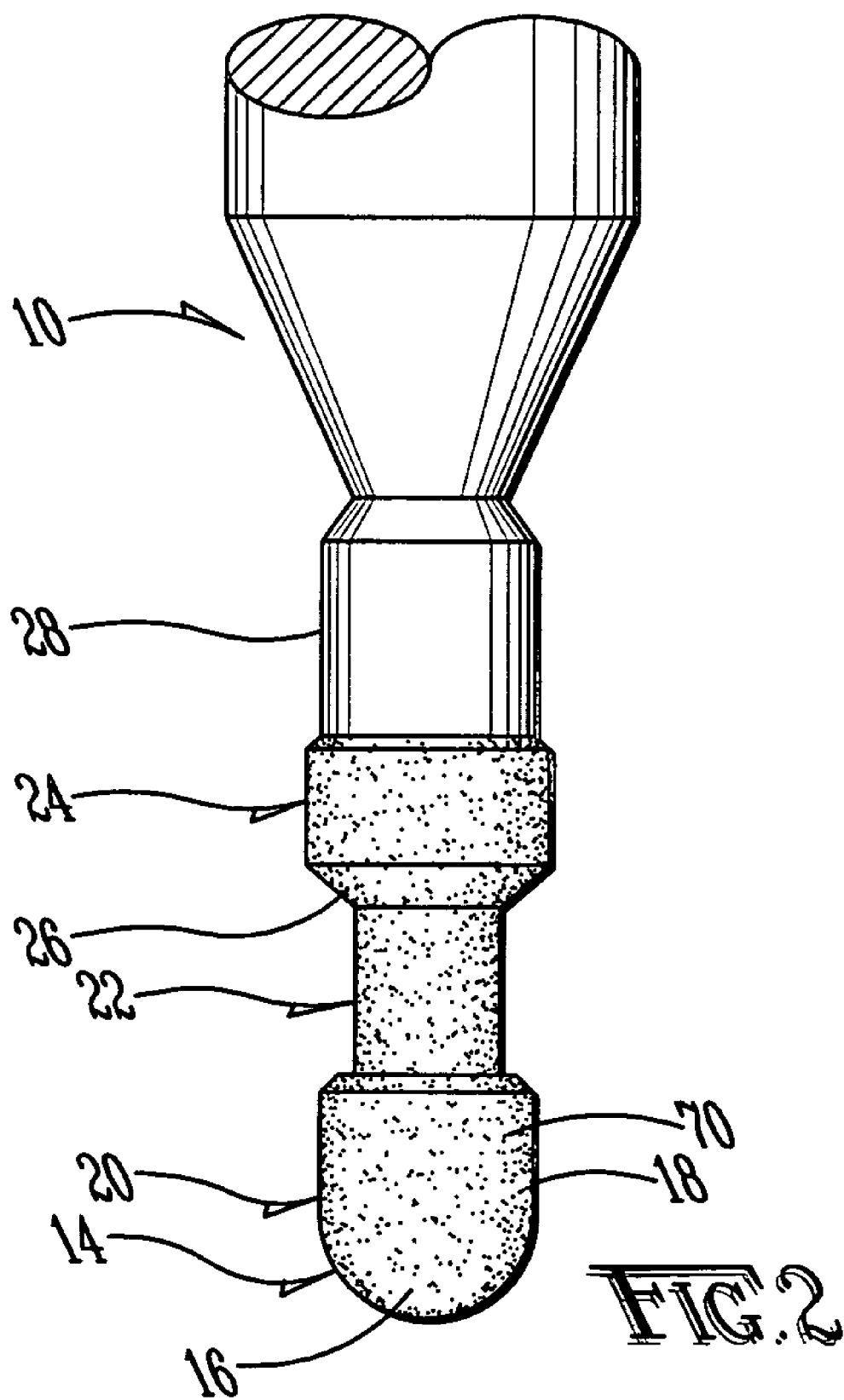
FIG. 2 illustrates a side elevation of the improved drill bit of the present invention.

As shown in FIG. 2, the drill bit (10) is preferably constructed of stainless steel, and is provided with a hemispherical tip (14) having a crown (16) and a perimeter (18). Although the tip may be of any suitable dimensions and configuration, in the preferred embodiment, the drill tip is hemispherical, having a radius of 1.05 millimeters, and is integrally formed as part of the first shaft (20). The first shaft (20) is preferably of a diameter between 0.4 and 4.0 millimeters, more preferably between 2.073 and 2.139 millimeters, and most preferably, of a diameter similar to the diameter of the drill tip (14).

Approximately 2.10 millimeters from the crown (16) of the tip (14), the first shaft (20) is integrally coupled to a second shaft (22), which is preferably 1.5 millimeters long and integrally coupled to a third shaft (24). As shown in FIG. 2, a tapered shoulder (26) is provided between the second shaft (22) and third shaft (24). Although the taper may be of any suitable angle, in the preferred embodiment, the shoulder (26) tapers at approximately a forty-five degree angle. The third shaft (24) is preferably 3.2 millimeters in diameter. As shown in FIG. 2, the third shaft (24) is integrally formed with the remaining body (28) of the drill bit (10). The diameters of the shafts (20), (22) and (24) may vary from a diameter of five centimeters or more to as small as existing technology would allow. Preferably, the first shaft (20) is provided with a diameter smaller than the third shaft (24), yet larger than the diameter of the second shaft (22). Preferably, the first shaft (20) is provided with a diameter five to thirty percent smaller than the third shaft (24), more preferably ten to twenty percent smaller, and most preferably about fifteen percent smaller. Similarly, the second shaft (22) is provided with a diameter thirty-five to eighty-five percent smaller than the diameter of the third shaft (24), more preferably forty-five to fifty-five percent smaller, and most preferably about forty percent smaller. Similarly, the second shaft (22) is provided with a diameter fifteen to fifty-five percent smaller than the diameter of the first shaft (20), more preferably twenty-five to thirty-five percent smaller, and most preferably about thirty percent smaller.

As shown in FIG. 2, applied to the hemispherical tip (14) and first shaft (20) is a course abrasive material (70), preferably of a sintered diamond grain type, utilizing diamond grain of one hundred forty grit, and utilizing diamonds of an irregular hexahedral shape. The second shaft (22), tapered shoulder (26) and third shaft (24) are preferably provided with a standard 200/230 grit abrasive. Of course, any suitable grit or abrasive material may be utilized and, although the second shaft (22) is preferably provided with an abrasive material to prevent dross and adhesive from adhering thereto during the drilling process, the second shaft (22) may be provided with no abrasive or may be provided with a low-friction material, such as TEFLON®, to reduce the adhesion of dross, resin or the like to the second shaft (22).

Figure 3:
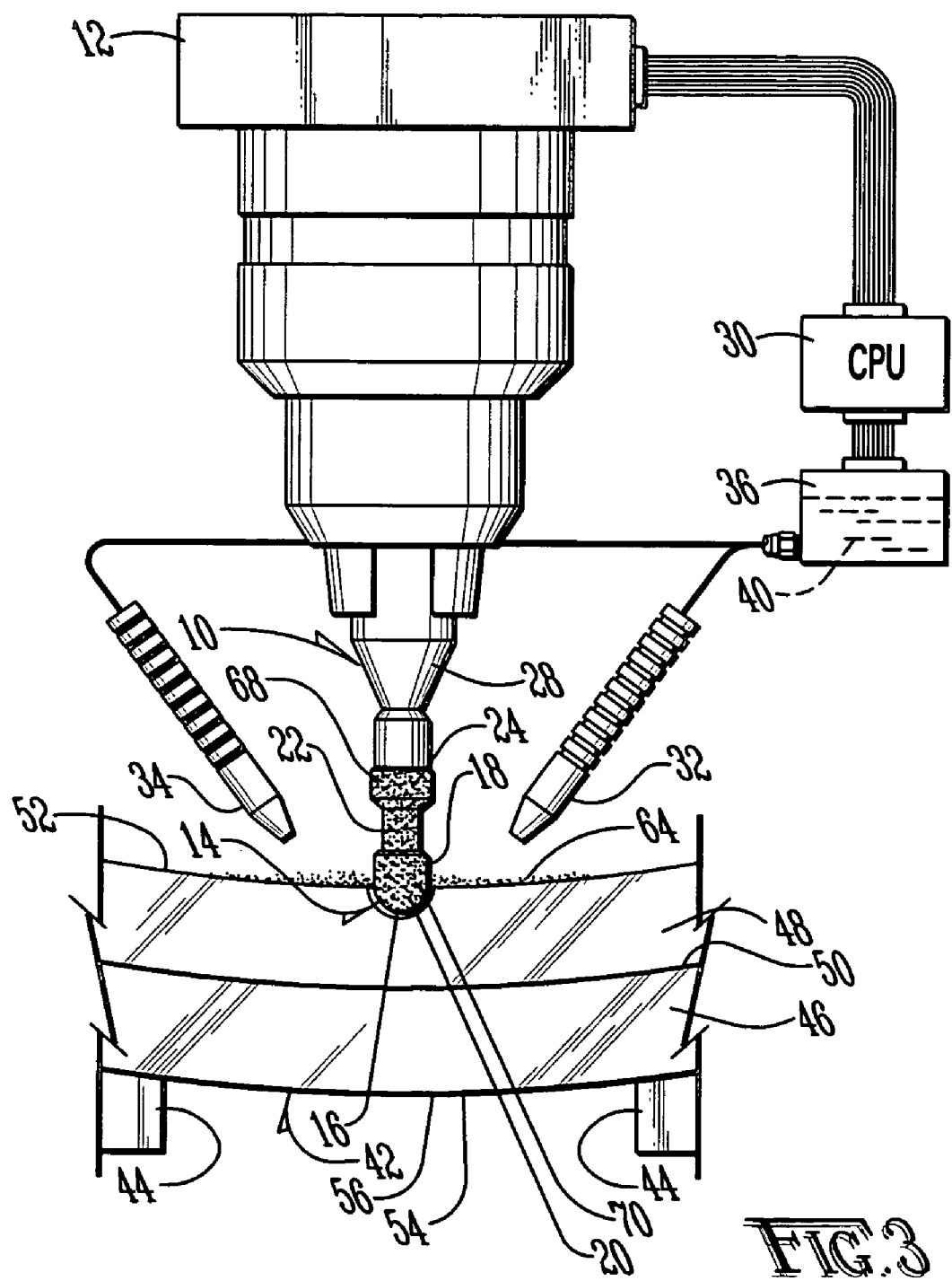
FIG. 3 illustrates a side elevation in partial cross-section of the drill and glass as the drill bit creates a recess in the concave portion of the glass.

As shown in FIG. 3, the drill press (12) is coupled to a central processing unit (30), of any type known in the art, to control the start, stop step and speed movements of the drill press (12), which will be explained in more detail below. Preferably the drill press (12) rotates the drill bit (10) at a speed between ten thousand and sixty thousand revolutions per minute, more preferably between twenty thousand and forty thousand revolutions per minute, and more preferably between about twenty-five and thirty-five thousand revolutions per minute, and most preferably about thirty thousand revolutions per minute.

Two nozzles (32) and (34) are coupled to a lubricant pump (36) containing a lubricant (38) which, in the preferred embodiment, is water (40). The lubricant pump (36) is coupled to the central processing unit (30) to precisely control the flow of lubricant (38) to the nozzles (32) and (34). The nozzles (32) and (34) may be of any suitable type known in the art, but are preferably provided with a 2.0 millimeter diameter nozzle opening, and are capable of each supplying one liter of water per minute.

To begin the drilling process, a piece of glass, which in the preferred embodiment is a lens (42) for eyeglasses or the like, is secured to a turntable (44) or similar retainer known in the art to secure the lens (42) in place during the drilling operation. Although the lens (42) may be of any suitable type known in the art, preferably the lens (42) is of a type that is described in U.S. Pat. No. 4,838,673, which is incorporated herein by this reference. The lens (42) includes a first mound (46) and a second mound (48) constructed of the finest mineral glass. Secured between the mounds (46) and (48) is a polarization film (50). As the polarization film (50) is sensitive to heat, it is desirable to maintain the lens (42) at a temperature below fifty degrees Centigrade throughout the drilling process. As shown in FIG. 1, the lens (42) includes a concave side (52) and a convex side (54). Preferably, the lens (42) is of a thickness equal to about three millimeters.

As shown in FIG. 1, when it is desired to drill a hole in the lens (42) for the attachment for a frame, accessory, or for any other desired purpose, the lens (42) is secured to the turntable (44) by vacuum or similar means known in the art. The central processing unit (30) is then actuated to cause the drill press (12) to rotate the drill bit (10) at a speed of about thirty thousand revolutions per minute, and motivate the drill bit (10) toward the lens (42) at a speed greater than about 0.2 millimeters per second, and preferably about 0.3 millimeters per second.

Figure 4:
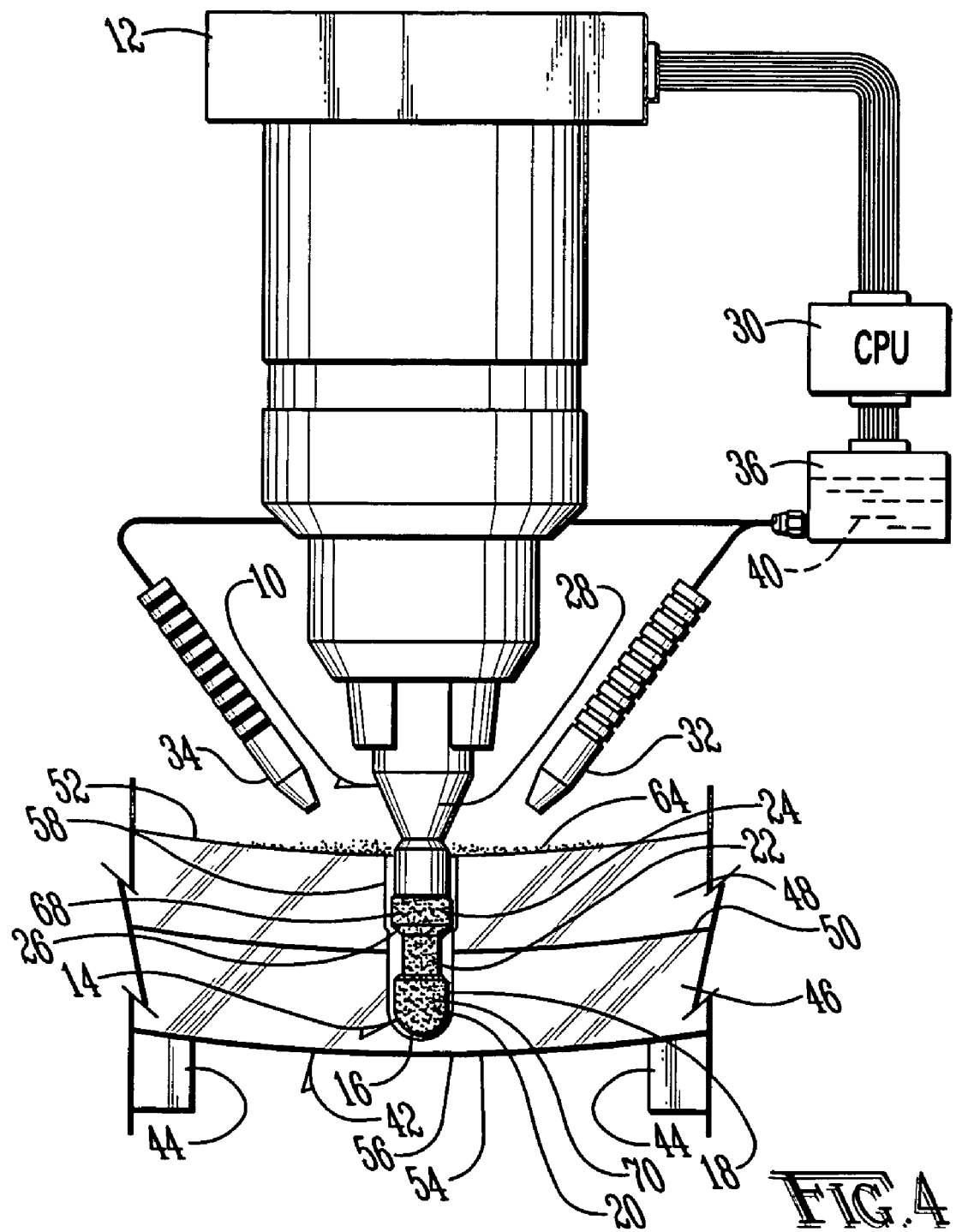
FIG. 4 illustrates a side elevation in partial cross-section of the drill and glass as the shoulder contacts the concave portion of the glass.
Figure 5:
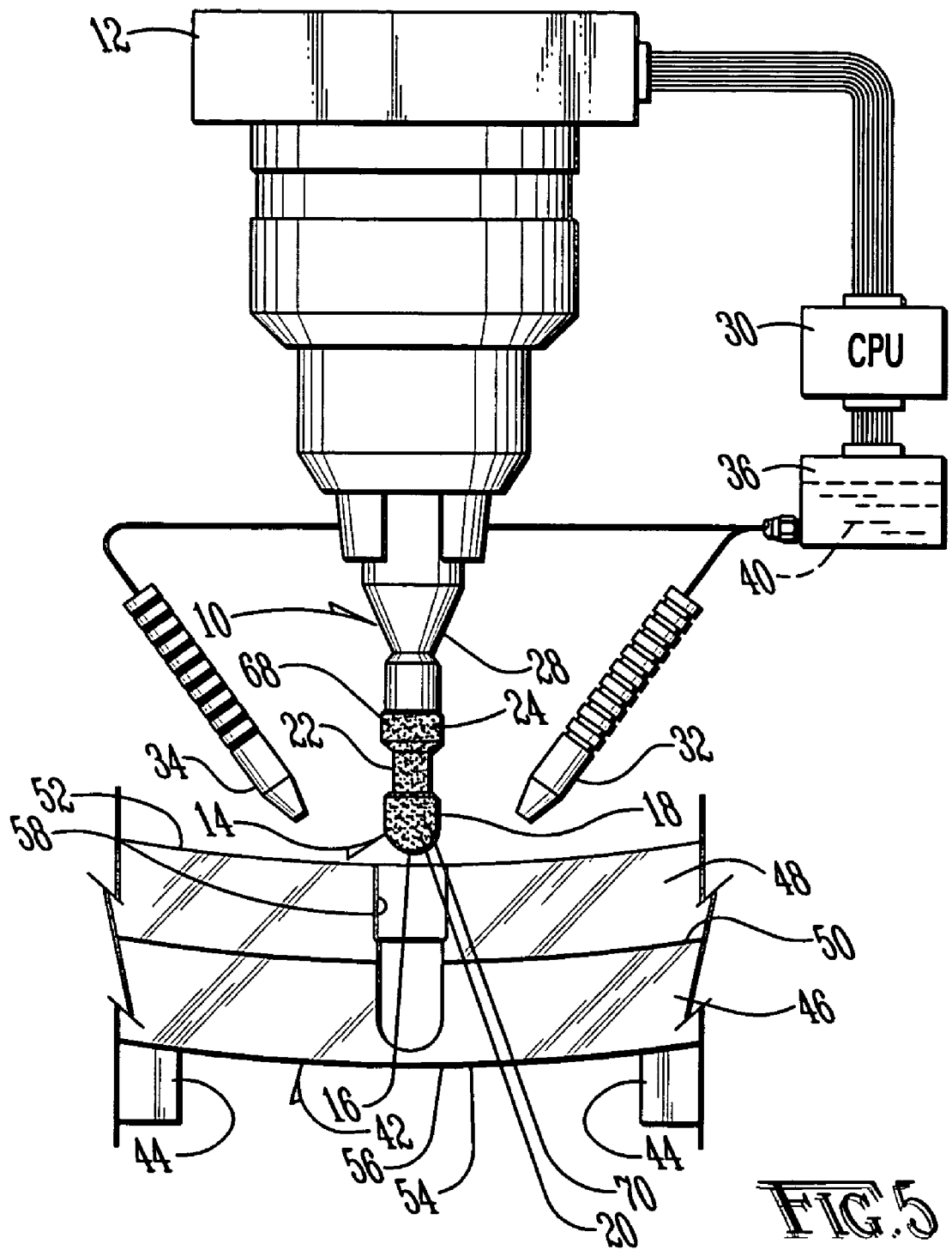
FIG. 5 illustrates a side elevation in partial cross-section of the drill and glass as the drill bit is stepped back from the convex side of the glass.

As shown in FIG. 3, the drill press (12) continues to motivate the drill bit (10) toward the concave side (52) of the lens (42) until the first shaft (20) completely enters the recess (60) created by the drilling process. As shown in FIG. 5, as the second shaft (22) is thinner, dregs (64) generated by the drilling process accumulate around the second shaft (22) where the nozzles (32) and (34) direct water (40) to remove the dregs (64). As shown in FIG. 4, the drill press (12) continues to motivate the drill bit (10) toward the lens (42) until the shoulder (26) contacts the lens (42). As the drill bit (10) rotates, the shoulder (26) cuts the recess (60) large enough to accommodate the thicker third shaft (24), which cuts the recess (60) to the desired diameter. The drill bit (10) is preferably motivated through the lens (42).

Figure 6:
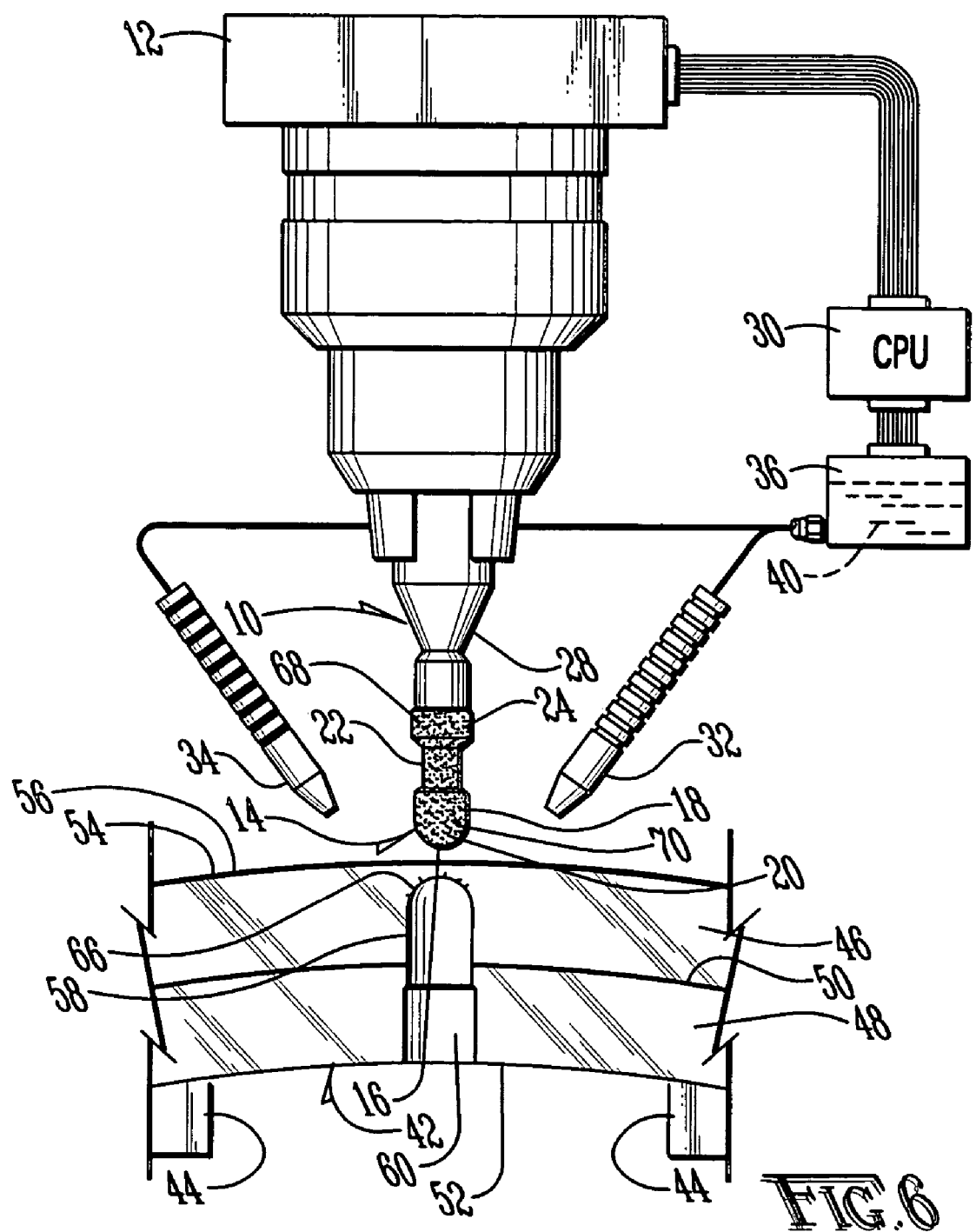
FIG. 6 illustrates a side elevation in partial cross-section of the drill and glass showing the drill bit prepared to drill the convex portion of the glass.
Figure 7:
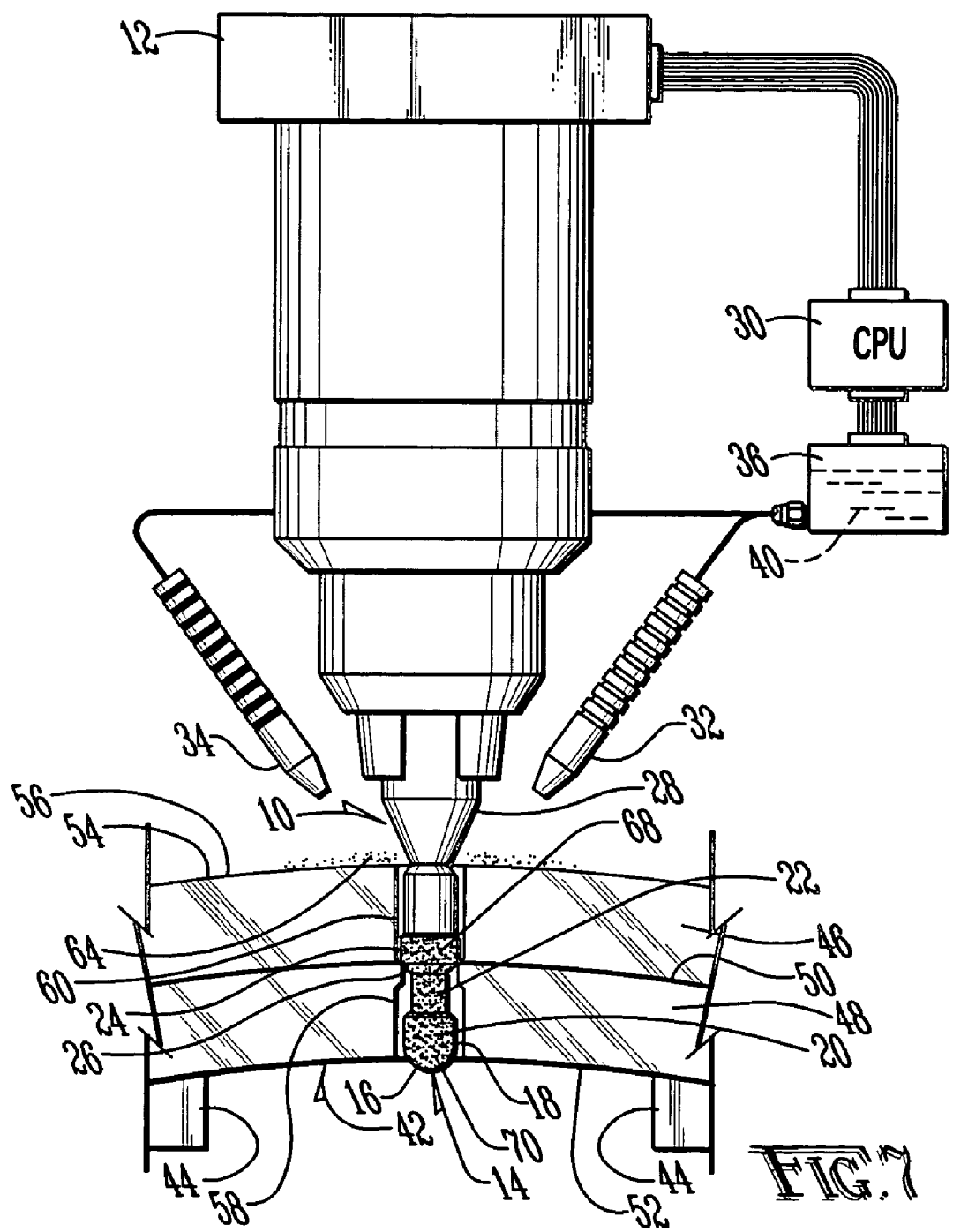
FIG. 7 illustrates a side elevation in partial cross-section of the drill and glass showing the drill bit continuing to pass completely through the glass.

Alternatively, the drill bit (10) may be retracted after the drill bit (10) has reached a predetermined depth, and the lens (42) released from the turntable (44). As shown in FIG. 6, the lens (42) may thereafter be flipped, properly aligned with the drill bit (10), and resecured to the turntable (44). Preferably, regardless of whether the lens (42) is being drilled from the concave side (52) or convex side (54), the drill bit (10) is directed at the lens (42) at an angle normal to the surface (56) of the lens (42). As an alternative to releasing and flipping the lens (42), an additional drill press (not shown), drill bit and nozzle assembly may be secured below the lens (42) so that once a recess (58) of a desired depth has been provided in the concave side (52) of the lens (42), the opposing drill bit is already properly aligned, thereby eliminating the need for realignment after the lens (42) is flipped.

Once the lens (42) is in the orientation shown in FIG. 6, the central processing unit (30) actuates the drill press (12) to motivate the drill bit (10) toward the convex side (54) of the lens (42) at a speed of about 0.3 millimeters per second. The drill press (12) continues to motivate the drill bit (10) until the recess (60) created thereby meets with the recess (58) provided on the opposite side of the lens (42). The drill press (12) continues to motivate the drill bit (10) until a throughbore (62) of constant diameter is created. Throughout the drilling process, the nozzles (32) and (34) continue to spray the drill bit (10), not only removing dregs (64) generated during the drilling process, but also to cool the drill bit (10) and lens (42) to prevent micro fractures (66) in the lens (42).

Figure 8:
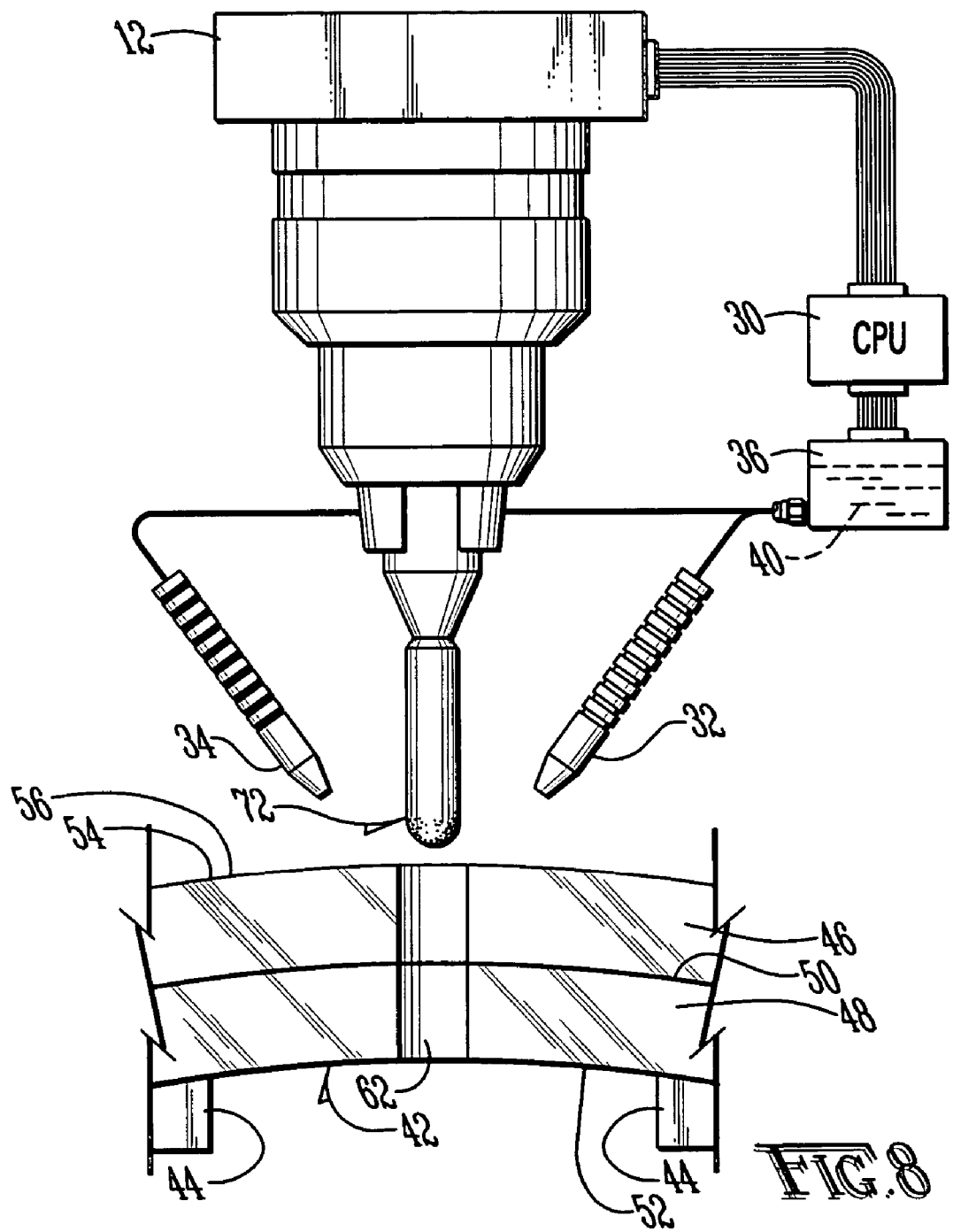
FIG. 8 illustrates a side elevation in partial cross-section of the drill and glass, showing a polishing bit being used to polish the interior sides of the hole.

Additionally aiding in the reduction in the formation of micro fractures (66) is the finer abrasive (68) applied to the third shaft (24), as compared to the coarser abrasive (70) provided on the first shaft (20). While the coarser abrasive (70) is better at cutting the lens (42), the finer abrasive (68) acts to simultaneously cut the lens (42) while polishing micro fractures (66) created by the coarser abrasive (70). The coarser abrasive (70) applied to the second shaft (22) prevents the dregs (64) from securing themselves to the second shaft (22) during the drilling process. As shown in FIG. 8, once the throughbore (60) has been created, a polishing bit (72), such as those known in the art to reduce micro fractures, is coupled to the drill press (12) and passed through the throughbore (60). Alternatively, any type of polishing known in the art may be utilized.

The drilling process is controlled by the central processing unit (30) which may either direct the drill press (12) to motivate the drill bit (10) through the lens (42) in a single motion, direct the drill press (12) to create recesses (58) and (60) on either side of the lens (42) to connect them and create the throughbore (62), or may be utilized in association with a "step" which motivates the drill press to move the drill bit (10) into and out of contact with the lens (42) in a series of steps as the nozzles (32) and (34) remove dregs (64) created by the drilling process. The step process may be utilized to further reduce micro fractures (66) by motivating the drill bit (10) at a slower rate as the recess (58) becomes deeper.

Figure 9:
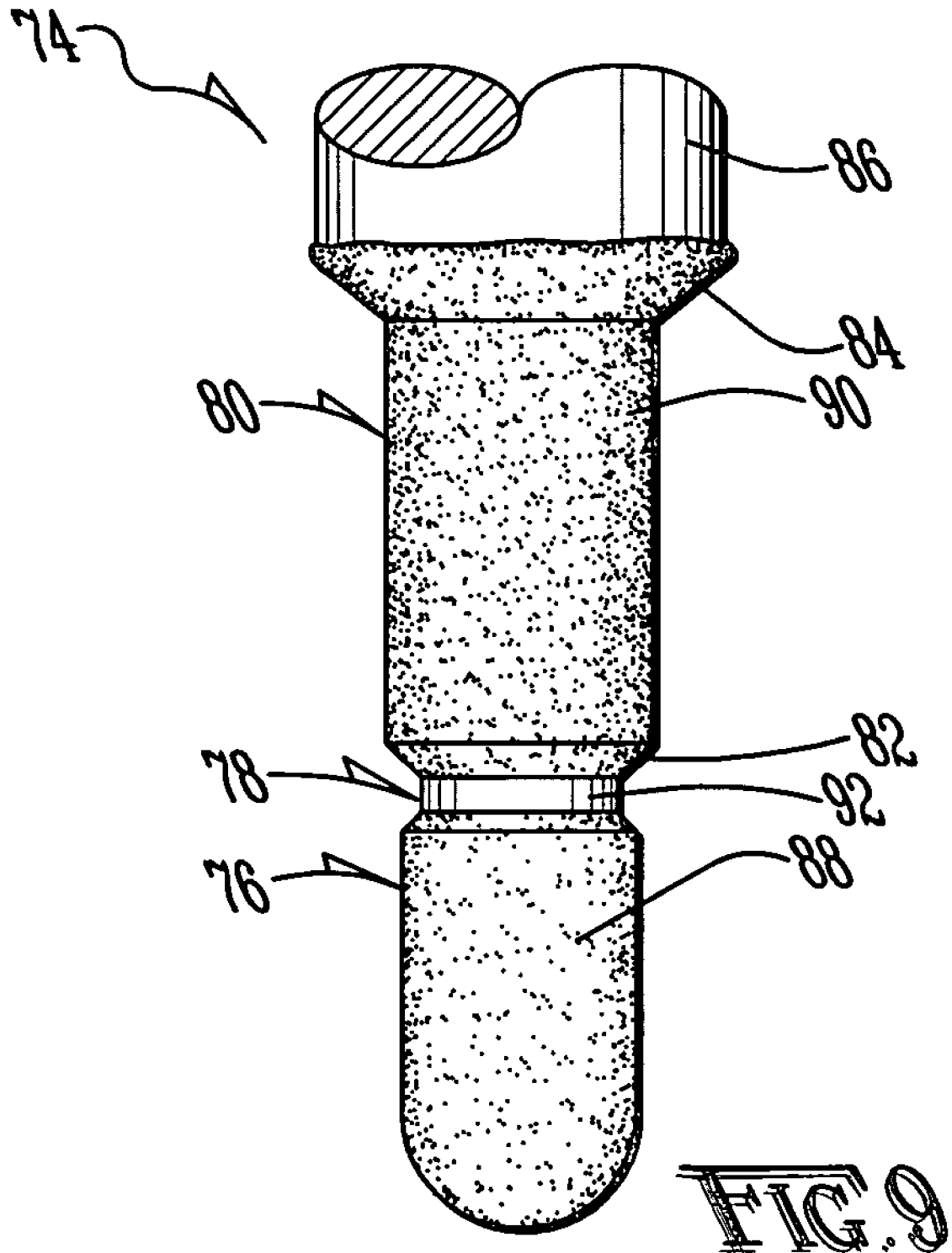
FIG. 9 illustrates a side elevation of an alternative drill bit of the present invention

An alternative drill bit is shown generally as (74) in FIG. 9. In this alternative embodiment, the first shaft (76) is much longer, the second shaft (78) is much shorter, and the third shaft (80) is, again, much longer than that described in the preferred embodiment. Additionally, the third shaft (80), in addition to being provided with a shoulder (82) tapering toward the second shaft (78), the third shaft (80) is also provided with a shoulder (84) tapering outward to the body (86) of the drill bit (74). As noted above, the first shaft (76) is provided with a coarse abrasive (88) such as that described above, while the third shaft (80) and shoulders (82) and (84) are provided with a fine grit abrasive (90), such as that described above. The second shaft (78), however, is not provided with abrasive and, in the preferred embodiment, is provided with a TEFLON® coating or similar low-friction material (92) to prevent dregs or the like from attaching to the second shaft (78) during the drilling process.

Although the invention has been described with respect to the preferred embodiment thereof, it is also to be understood that it is not to be so limited, since changes and modifications can be made therein which are within the full, intended scope of this invention as defined by the appended claims. For example, the dimensions of the drill bit and abrasives may be adjusted to accommodate various types and thicknesses of glass. The drilling process may also include a plurality of steps forward and rearward to reduce micro fractures and to maintain the lens (42) at a desired temperature. Although assemblies described herein are preferably constructed within a ninety percent variance, and more preferably within a twenty-five percent variance from the dimensions listed above, they may be constructed of any suitable size or materials.

What is claimed is:

1. A method for drilling glass comprising:
   (a) providing a drill;
   (b) providing a drill bit comprising:
      (i) a first shaft having a circular cross-section of a first diameter;
      (ii) a tapered tip coupled to said first shaft;
      (iii) a second shaft having a circular cross-section of a second diameter, said second shaft being coupled to said first shaft;
      (iv) a third shaft having a circular cross-section of a third diameter, said third shaft being coupled to said second shaft;
      (v) wherein said second shaft is coupled between said first shaft and said third shaft;
      (vi) wherein said first diameter is greater than said second diameter;
      (vii) wherein said third diameter is greater than said second diameter;
      (viii) wherein said third diameter is greater than said first diameter;
      (ix) a first abrasive secured to said first shaft;
      (x) a second abrasive secured to said second shaft; and
      (xi) wherein said second abrasive is finer than said first abrasive.
   (c) coupling said drill bit to said drill;
   (d) providing a piece of glass;
   (e) rotating said drill bit;
   (f) drilling said drill bit into said glass until said first shaft and said second shaft cut a hole into said glass;
   (g) moving a fluid across said drill bit to remove glass as said drill bit is drilling;
   (h) providing a polishing bit; and
   (i) rotating said polishing bit in sufficient proximity to said hole to polish said hole.

2. A method for drilling glass comprising:
   (a) providing a drill;
   (b) providing a drill bit comprising:
      (i) a first shaft having a circular cross-section of a first diameter;
      (ii) a tapered tip coupled to said first shaft;
      (iii) a second shaft having a circular cross-section of a second diameter, said second shaft being coupled to said first shaft;
      (iv) a third shaft having a circular cross-section of a third diameter, said third shaft being coupled to said second shaft;
      (v) wherein said second shaft is coupled between said first shaft and said third shaft;
      (vi) wherein said first diameter is greater than said second diameter;
      (vii) wherein said third diameter is greater than said second diameter; and
      (viii) wherein said third diameter is greater than said first diameter.
   (c) coupling said drill bit to said drill;
   (d) providing a piece of glass;
   (e) rotating said drill bit;
   (f) drilling said drill bit into said glass until said first shaft and said second shaft cut a hole into said glass; and
   (g) further comprising drilling a supplemental hole in an opposite side of said glass to a depth sufficient to connect said hole to said supplemental hole.

* * * * *